April 24, 1928.  W. N. BOOTH  1,667,024
VEHICLE WHEEL
Filed Aug. 21, 1922
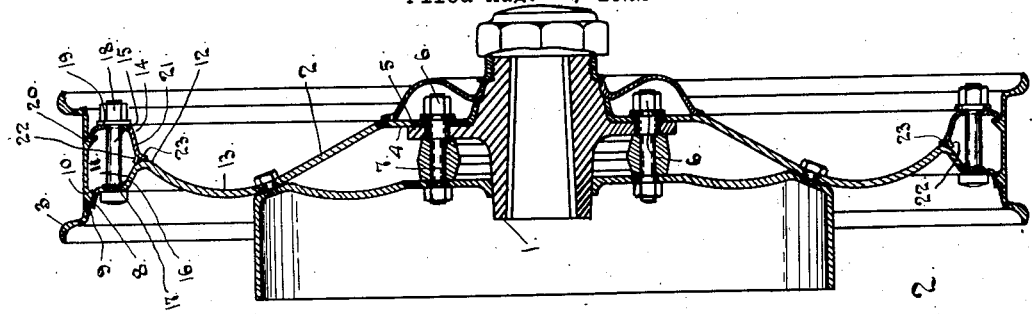
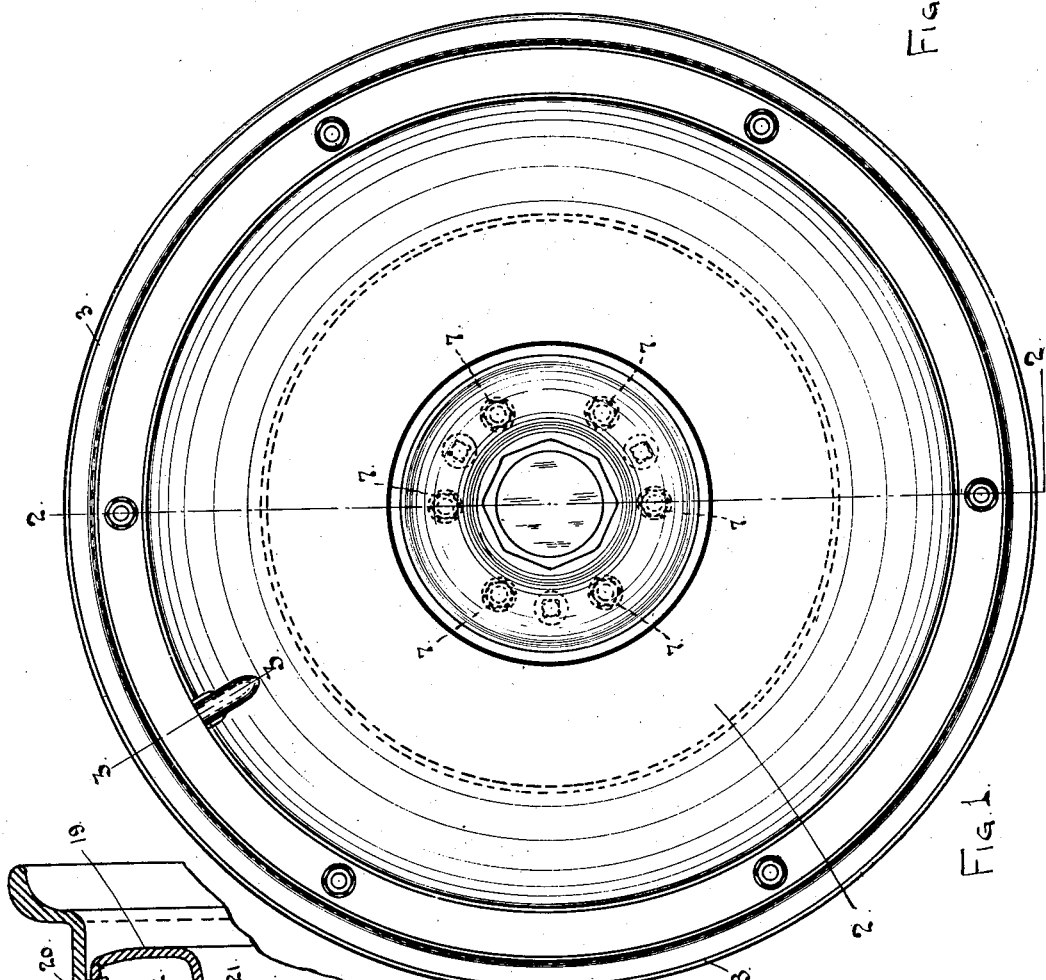
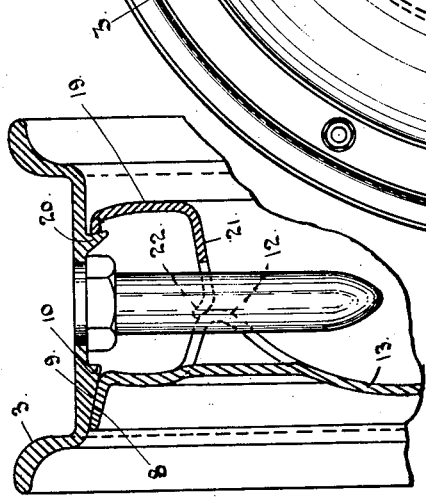
Inventor
WILLIAM N. BOOTH Patented Apr. 24, 1928.

1,667,024

UNITED STATES PATENT OFFICE.

WILLIAM N. BOOTH, OF DETROIT, MICHIGAN.

VEHICLE WHEEL.

Application filed August 21, 1922. Serial No. 583,340.

The invention relates to vehicle wheels and refers particularly to a device for securing a demountable rim upon a disk wheel body. One of the objects of the invention is to provide a simple form of clamp which is engageable with the demountable rim and disk and provided with means for positioning itself concentrically upon the wheel body. With this and other objects in view, the invention resides in the novel features of construction as more fully hereinafter set forth.

In the drawings:

Figure 1 is a side elevation of a vehicle wheel embodying my invention;

Figures 2 and 3 are cross sections respectively on the lines 2—2 and 3—3 of Figure 1.

1 is the hub, 2 the disk forming the wheel body, and 3 the demountable rim. The disk has the inner annular portion 4 detachably secured to the annular flange 5 of the hub by the nuts 6 threadedly engaging the outer ends of the bolts 7 which are secured to the annular flange. The disk has the inclined outer edge portion 8 forming a flared seat engageable by the correspondingly inclined face 9 of the bead 10 near the inner edge of the demountable rim. 11 is the outer annular portion of the disk connecting into the inclined outer edge portion and in turn connected into by the outwardly dished portion 12 which latter forms in effect a bead. 13 is the inwardly dished portion of the disk connecting the outwardly dished portion and the inner annular portion of the disk.

To clamp the demountable rim upon the seat formed by the outer inclined edge portion 8 of the disk, I have provided the transversely split channel-shaped ring 14 through the base of which the bolts 15 freely extend. These bolts extend transversely of the outer annular portion 11 of the disk and are fixedly secured thereto by suitable means such as fins 16 sheared from the corners of the polygonal portions 17 of the bolts passing through the outer annular portion. Nuts 18 threadedly engage the outer ends of the bolts and abut the outer face of the base of the ring. The ring has the outer side flange 19, the edge of which is engageable with the outer face of the bead 20 near the outer edge of the demountable rim, the face being preferably inclined toward the demountable rim in the direction of the central plane of rotation or plane of impact. The ring also has the inner side flange 21 which has at its edge the sheared diverging outwardly and inwardly inclined foot flanges 22 and 23 respectively, which are preferably curved to fit the curvature of the outer face of the bead formed by the outwardly dished portion 12 of the disk. The inwardly extending foot flanges 23 are positioned radially inward from the bolts 15 and prevent the inner side flange of the ring from riding over the radial outer face of the outwardly dished portion of the disk, while these inwardly extending foot flanges with the outwardly extending foot flanges engaging the bead on the disk concentrically position the ring. Since this ring is in engagement with the inner face of the demountable rim when the latter engages its seat, the ring assists in supporting the rim upon the disk.

The valve stem and its cap are located at the outside of the disk which is depressed as shown particularly in Figure 3. The transverse split in the ring also preferably occurs at this point and the inner flange of the ring is cut away from the passage of the stem and cap.

In applying the demountable rim upon the disk, the ring fulcrums first about the inwardly extending foot flanges 23, and as the nuts 18 are tightened, the outer side flange of the ring moves radially outward upon the outer bead of the demountable rim until it comes into contact with the inner face of the base of the rim. At this time, the outwardly extending foot flanges 22 of the ring are also in engagement with the outer face of the outwardly dished portion 12 of the disk.

What I claim as my invention is:

1. In a vehicle wheel, the combination with a disk having an outer flared portion forming a seat and a beaded portion, of a demountable rim engageable with said outer flared portion, and a clamp engageable with said demountable rim and having a flange terminating in peripherally separated diverging foot flanges engageable with said beaded portion to position said clamp concentrically upon said disk.

2. In a vehicle wheel, the combination with a disk having an outer flared portion forming a seat and a beaded portion, of a demountable rim engageable with said outer flared portion, and a channel-shaped clamp having an outer flange engageable with said demountable rim, and an inner flange terminating in peripherally separated diverging foot flanges engageable with said beaded portion to position said clamp concentrically upon said disk.

3. In a vehicle wheel, the combination with a disk having an outer flared portion, an outer annular portion connecting into said flared portion, a dished portion connecting into said annular portion, of a demountable rim adapted to seat upon said outer flared portion, a channel shaped transversely split ring having an outer flange engageable with said demountable rim, and an inner flange terminating in peripherally separated outwardly and inwardly extending foot flanges engageable with said dished portion to position said ring concentrically upon said disk, bolts extending transversely of and secured to said outer annular portion and extending freely through the base of said ring, and nuts threadedly engaging said bolts and adapted to abut the base of said ring for laterally moving the same toward said annular portion.

4. In a vehicle wheel, a wheel body having a flared seat and a radially inwardly spaced beaded portion, in combination with a demountable rim engageable with said flared seat and a sheet metal channel shaped clamping ring having an outer flange engageable with said demountable rim and an inner flange transversely sheared to terminate in peripherally separated diverging foot flanges engageable with said beaded portion to position said ring concentrically upon said wheel body.

In testimony whereof I affix my signature.

WILLIAM N. BOOTH.